United States Patent [19]

Lundgren

[11] 4,186,125

[45] Jan. 29, 1980

[54] METHOD FOR IMPROVING THE IMPACT STRENGTH OF A PLASTICS MATERIAL

[75] Inventor: Bengt Lundgren, Ulricehamn, Sweden

[73] Assignee: SKF Nova AB, Gothenburg, Sweden

[21] Appl. No.: 883,508

[22] Filed: Mar. 6, 1978

[30] Foreign Application Priority Data

Mar. 28, 1977 [SE] Sweden ................................ 7703487

[51] Int. Cl.$^2$ ............................ C08K 3/08; C08K 7/14
[52] U.S. Cl. ............................... 260/42.18; 260/37 M; 260/42.22; 260/40 R
[58] Field of Search ............... 260/37 M, 42.22, 42.18; 428/283, 328

[56] References Cited

U.S. PATENT DOCUMENTS

| | | | |
|---|---|---|---|
| 2,683,673 | 7/1954 | Silversher | 428/328 X |
| 2,748,099 | 5/1956 | Bruner et al. | 260/37 M |
| 2,868,759 | 1/1959 | Bechu | 260/37 M X |
| 3,112,283 | 11/1963 | Hansen et al. | 260/37 M X |
| 3,414,455 | 12/1968 | Twomey et al. | 428/328 X |
| 3,427,264 | 2/1969 | Forster et al. | 260/42.22 X |
| 3,494,884 | 2/1970 | Kroft | 260/42.22 X |
| 3,908,064 | 9/1975 | Weidenhenner et al. | 260/42.22 X |
| 3,931,094 | 1/1976 | Segal et al. | 260/37 M X |

FOREIGN PATENT DOCUMENTS 984527 2/1965 United Kingdom ..................... 428/328

OTHER PUBLICATIONS

J. Delmonte, *Metal-Filled Plastics* (1961), pp. 89–91, 101–103, & 126–127.

*Primary Examiner*—Sandra M. Person
*Attorney, Agent, or Firm*—Eugene E. Renz, Jr.

[57] ABSTRACT

A method for improving the impact strength of fiber reinforced plastic materials hard at ambient temperatures is described, the improvement comprising introducing particulate metal in the form of deformable particles of about 2–20 μm thickness and having a length of about 10–20 times the thickness, the metal particles constituting about 10 to 80% and preferably about 20 to 50% by weight of the composition, and said particles being in contact with each other, and the composition containing a fiberglass mat of about 300 g/m$^2$, whereby the impact resistance of the composition is rendered many times greater than the additive impact resistance imparted by either the reinforcing fibers or deformable metal particles alone.

7 Claims, 1 Drawing Figure

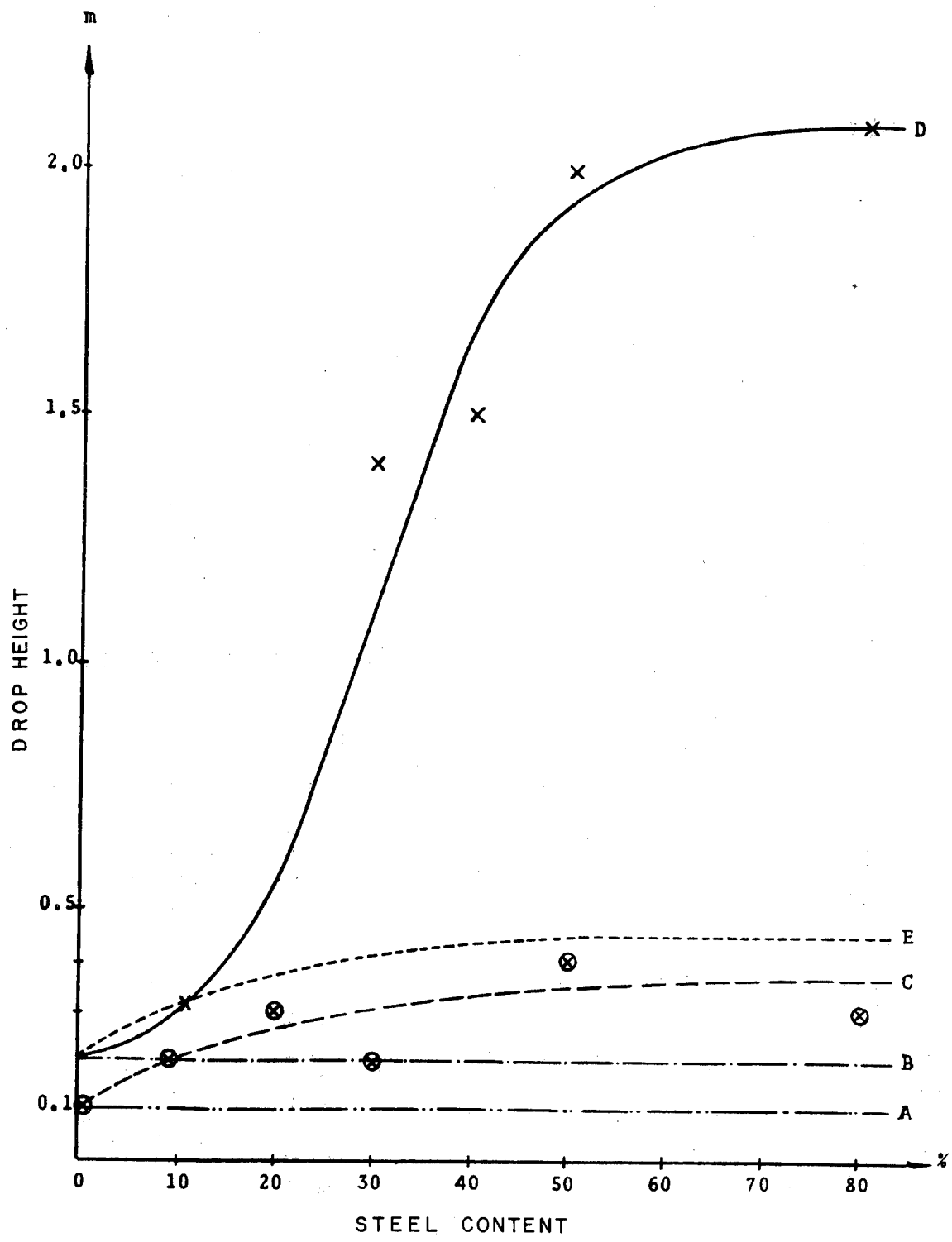

METHOD FOR IMPROVING THE IMPACT STRENGTH OF A PLASTICS MATERIAL

This invention refers to a method for improving the impact strength of a plastic composite material including a plastic, which is hard at indoor temperature and a fiber reinforcement.

Thermoset plastics and other plastics which are hard at indoor temperature have, when they are clean and not reinforced, a comparatively low impact strength, which means that the plastic will crack or fracture even under relatively light blows. Reinforcement e.g. with woven glass will give only a marginal improvement to the ability of the plastic to withstand crack formation. The reinforcement serves to prevent disintegration of the material at comparatively hard blows but cracks are formed in the material even under light blows.

It is known to mix plastic materials with fillers, i.e. pulverulent materials, such as chalk, wood powder and different oxides primarily as filling materials. Such fillers, however, generally do not bring about any improvement of the ability of the plastic to withstand crack formation. For making a polymeric material having electric conductivity it is also known to admix metal powder into the polymeric material but this is entirely beside the purpose of the present invention.

The purpose of the present invention is to provide in a simple manner and by aid of simple and inexpensive means a plastic which is heard at ambient temperatures and with a fiber reinforcement, which plastic material has an impact strength considerably greater than previously known materials of this type.

This is achieved according to the invention by mixing particles of deformable metal or a similar material into the plastic.

The particle content in the plastic is made so large that the separate particles contact each other. When the material exposed to blows the impact energy to work of large extent will be absorbed as a deformation in the metal particles. The fibre reinforcement thereby rendered sufficient prevent crack formation in the material even under heavy blows.

If particles of material with poor permanent deformability e.g. silica sand is used a considerably lower impact strength is obtained since the grit will be crushed on impact without absorbing any appreciable energy, which instead must be absorbed by the plastic material with crack formation as a result.

The metal particles are in contrast e.g. to the grit permanently deformed to a large extent so that appreciable deformation energy is absorbed in each separate particle. It is therefore particularly suitable to mix into the plastic particles of materials which are highly deformable such as e.g. lead or steel.

As examples of what can be achieved according to the present invention some test results are set forth below. The tests were made by dropping a 0.5 Kg ball onto test plates measuring 150×150×5 mm composed of a polyester material. The plates were placed on a rigid base below the ball, which was dropped from varying heights. The drop height which produced initial crack formation in the plastic was registered. One test series was made with plates of a pure polyester, another test series was made with plates of polyester reinforced with a glass fibre mat 300 g/m$^2$, another test series was made with plates of pure polyester mixed with steel powder in proportions of 10, 20, 50 and 80% by weight and a final test series was made plates of polyester reinforced with a glass fiber mat according to the above and with an addition in the polyester plastic of 10, 20, 30, 40, 50 and 80% by weight of steel powder respectively, mainly in the form of grinding chips from a ball bearing steel with a thickness of about 2–20 μm and a length of about 10–20 times the thickness.

The test results are shown in the attached diagram, from which the dramatic improvement in impact strength is clearly visible. The drop height of the ball at initial crack formation is shown in the diagram on the vertical axis and the content of added steel powder in percent by weight in the plastic is shown on the horizontal axis. The line A shows the drop height for plates of pure polyester and the line B shows the drop height for plates of polyester with a reinforcement of a glass fiber mat. The glass fiber reinforcement as can be seen improves the ability to withstand crack formation in the plates to some extent. The test results for plates without reinforcement but with varying contents of steel powder added are marked with circled crosses. On the basis of these results it appears that a continuously varied admixture of steel powder would give a curve which generally corresponds to the line C. As can be seen a certain improvement of the ability to withstand crack formation can be obtained at least an compared to plates of pure polyester.

A marked improvement of the ability to withstand crack formation is obtained on admixture of steel powder and the plastic in glass fiber reinforced polyester plastic plates. The test results with varying amounts of steel powder added are marked with crosses. On basis of these results it is seen that a continuous variation of the steel powder content gives a curve which corresponds to the line D. It is clearly apparent that the resulting improvement of strength is far about what would be expected to be obtained by addition of the effect attained with glass fiber reinforcement alone and the effect obtained from metal powder admixture alone. A simple addition of the separate effects should give a curve, which corresponds to curve E. The invention as can be seen provides dramatic improvement in the steel powder content range between 20 and 80% by weight in the plastic. A higher content of steel powder than about 80% destroys the continuous phase of the plastic material so that no integral test bodies can be made.

I claim:

1. In a method for improving the impact strength of a composition comprising a matrix of plastic which is hard at ambient temperatures and which contains reinforcing fibers and particulate metal, the improvement which comprises incorporating said particulate metal in the form of deformable particles of about 2–20 μm thickness and having a length of about 10–20 times said thickness, said metal particles constituting about 10 to about 80% by weight of said composition and being present in such an amount that said particles are in contact with each other, whereby the impact resistance of said composition is synergistically greater than the additive impace resistance imparted to the matrix by either said reinforcing fibers or deformable metal particles due to the absorption of impact energy as work of deformation of said particles.

2. A method according to claim 1 wherein the metal particles constitute about 20 to about 50% by weight of said composition.

3. A method according to claim 1 wherein the metal is steel.

4. A method according to claim 2 wherein the metal particles are grinding chips from ball bearing steel.

5. A method according to claim 1 wherein the metal is lead.

6. A method according to claim 1 wherein the reinforcing fibers are in the form of a fiberglass mat of 300 g/m$^2$.

7. A method according to claim 4 wherein the reinforcing fibers are in the form of a fiberglass mat of 300 g/m$^2$.

* * * * *